March 3, 1931.  E. R. WITZEL  1,794,392
AUTOMATIC GENERATING PLANT
Filed April 4, 1927  2 Sheets-Sheet 1

WITNESSES  INVENTOR
Irving J. Rose  Earl R. Witzel
M. E. Downey  By R. S. Caldwell
  ATTORNEY March 3, 1931.  E. R. WITZEL  1,794,392
AUTOMATIC GENERATING PLANT
Filed April 4, 1927   2 Sheets-Sheet 2

WITNESSES.
Irwin J. Rose
M. E. Downey

INVENTOR.
Earl R. Witzel
BY R. S. Caldwell
ATTORNEY.

Patented Mar. 3, 1931

1,794,392

UNITED STATES PATENT OFFICE

EARL R. WITZEL, OF KOHLER, WISCONSIN, ASSIGNOR TO KOHLER COMPANY, OF KOHLER, WISCONSIN, A CORPORATION OF WISCONSIN

AUTOMATIC GENERATING PLANT

Application filed April 4, 1927. Serial No. 180,985.

This invention relates to gas-engine-operated generating units of the demand starter type and has for its object to utilize for the larger units (such as 3 or 10 K. W. capacity) the same automatic switching mechanism that is used for units of smaller capacity (such as 1½ K. W. capacity) by merely adding an auxiliary relay to become effective when the demand on the mains reaches a predetermined value for protecting the series holding coils of the switching mechanism from excessive current that would be likely to injure them.

Another object of the invention is to accomplish that purpose by establishing a shunt circuit around the series holding coils and the contacts controlling them whereby they are relieved of the burden of carrying all of the line current and are only permitted to carry the current for which they are designed.

Another object of the invention is to provide such holding coil protecting shunt circuit with means for automatically varying the resistance thereof, depending on the current demand on the mains to increase the proportionate share of current passing through said protecting circuit as the current demand increases, and so further prevent excessive current flow through the series holding coils.

With the above and other objects in view the invention consists in the automatic generating plant as herein claimed and all equivalents.

Figure 1:
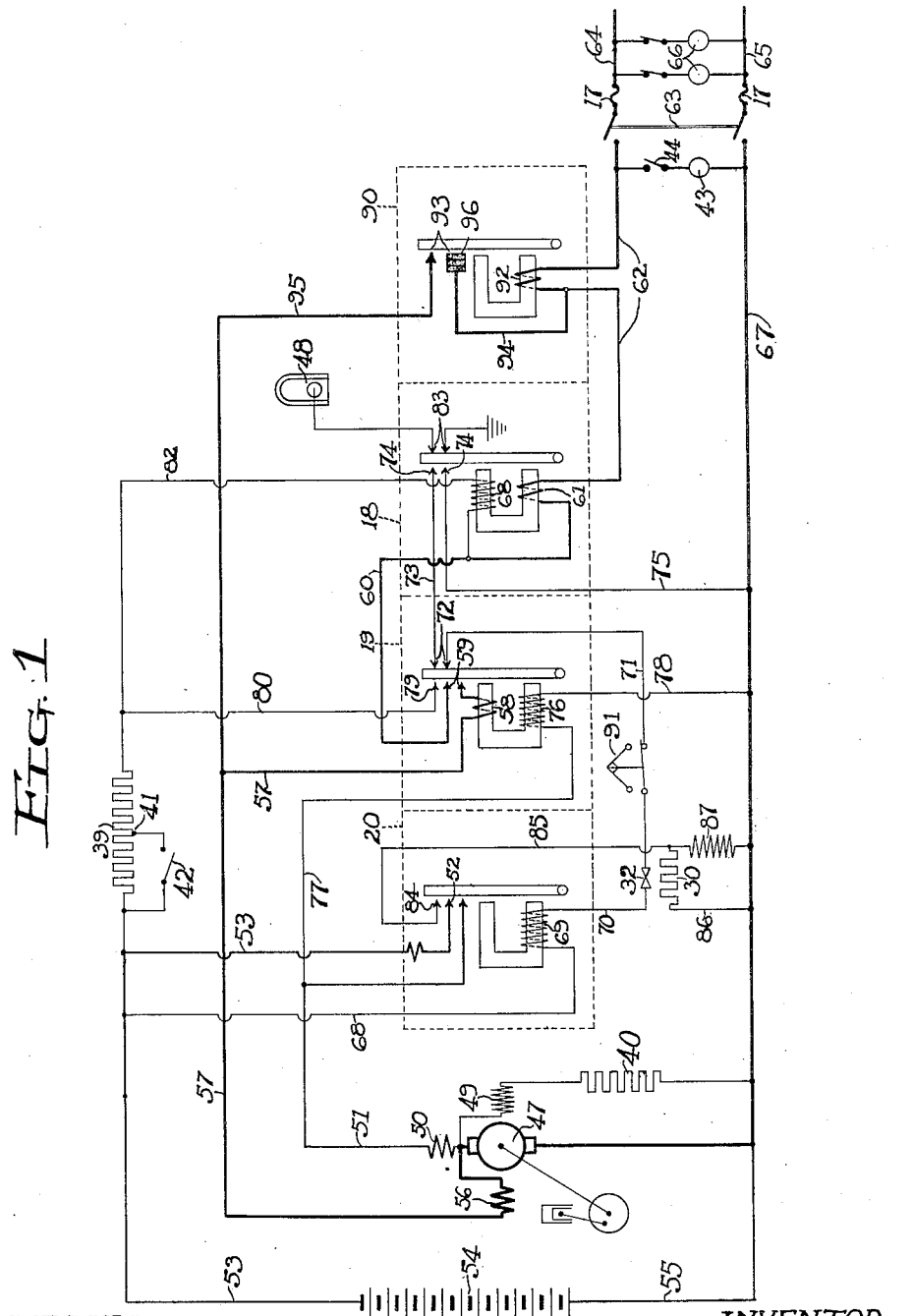
Figure 2:
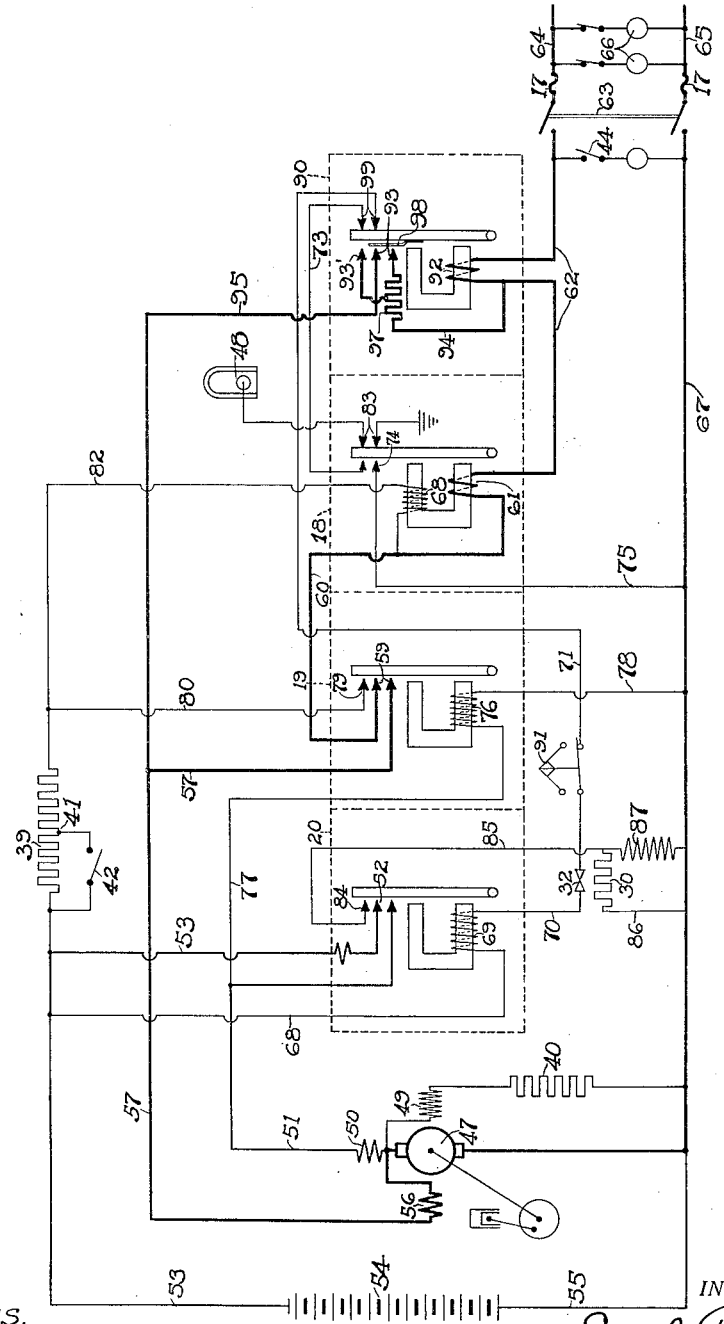

Referring to the accompanying drawings in which like characters of reference indicate similar parts in different views, Fig. 1 is a diagram of circuit connections of an automatic generating plant of the present invention, and Fig. 2 is a diagram of a modification thereof.

In these drawings, the three magnetic switches usually employed for the automatic control of gas-engine-operated generators of low capacity (such as 1½ K. W.) are indicated by the reference characters 18, 19 and 20 respectively, the first of which is the control switch for starting and stopping the power plant in the presence or absence of a load on the mains, the second is the generator relay for connecting the generator with the line when the generator functions, and the third is the cranking switch for cranking the engine with the generator operating as a motor. The auxiliary switch for adapting such automatic switching mechanism to function for generating units of greater capacity (such as 3 or 10 K. W. or more) is indicated at 90 and the details of these switches will appear from further description thereof.

The gas-engine-driven generator is indicated at 47 and the magneto 48 of the gas engine is separated therefrom for convenience. The generator is provided with a shunt field 49 having a resistance element 40 in series therewith.

A series field 50 of the generator, effective when it is operated as a motor for cranking the engine, is connected by wire 51 with one of the motor-starting contacts 52 of the cranking switch 20, the other of said contacts being connected by a wire 53 with one terminal of the storage battery 54, the other terminal of which is connected by a wire 55 with the negative terminal of the generator to complete what is herein referred to as the cranking circuit.

The generator series field 56 is connected by a wire 57 to a series winding 58 of the generator relay 19, the other end of said winding being connected with one of the pair of contacts 59 of said relay, the other of which is connected by a wire 60 with one end of a series winding 61 of the control switch 18, the other end of which is connected by a wire 62 with one blade of the main knife switch 63, which connects it through one of the fuses 17 with one of the line wires 64, the other line wire 65 with the load indicated as lamps 66 between them being similarly connected through one of the fuses 17 and the other blade of the main knife switch with the wire 67 leading to the negative terminal of the generator. This constitutes what is herein referred to as the generator circuit.

A wire 68 leading from the positive battery terminal connects with one end of the winding 69 of the cranking switch 20, the other terminal of which is connected by wire 70 to one of the contacts 32 of the thermostatic switch, the other of said contacts being connected by a wire 71 including a governor switch 91 with one of the pair of back contacts 72 of the generator relay 19, the other of which is connected by a wire 73 with one of the pair of contacts 74 of the control switch 18, the other of which contacts is connected by a wire 75 with the negative terminal of the battery, thus completing what is herein referred to as the cranking control circuit.

The other magnet winding 76 of the generator relay 19 forms a voltage coil across the terminals of the generator, but, for convenience, its circuit may be traced from one terminal of the generator through the series field winding 50, wire 51 and wire 77 to said winding 76 and from said winding through wire 78 to the other terminal of the generator.

For recharging the battery, which is preferably of lower voltage than the line voltage, such as a 24 volt battery on a 110 volt unit, there is a circuit controlled by the closing of the generator relay 19, from the positive terminal of the generator through series field 56, wire 57, coil 58, contacts 59 and 79, wire 80, battery-charging resistance 39, wire 53, battery 54, and wire 55, to the negative terminal of the generator. This is herein referred to as the battery-charging circuit and the rate of charge may be varied by the operation of the switch 42, which is connected between the tap clip 41 of the resistance unit 39 and the wire 53 so as to short circuit a part of the resistance.

The other winding 68 of the control switch 18 is of fine wire with many turns and is intended to be energized by the weak flow of current from the low voltage battery through the mains when a load circuit is closed while the generator is idle. The circuit through this winding 68 may be traced from the battery 54 through wire 53, resistance 39, wire 82, winding 81, wire 60, winding 61, wire 62, to line wire 64, and through the load 66 to line wire 65, and by way of wires 67 and 55 to the negative terminal of the battery.

In order that the power plant may cease operating when there is no load on the mains, the magneto 48 of the engine is grounded by a pair of back contacts 83 closed by the opening of the control switch 18.

The heating coil 30 of the thermostatic switch for disconnecting the contacts 32 of the cranking circuit when the engine fails to crank within a reasonable time, is in a circuit controlled by the cranking switch 20, which may be traced from the battery through wire 53, contacts 52 and 84, wire 85, heating coil 30 and wires 86 and 55 to the battery. Preferably there is also included in this circuit in parallel with the heating coil 30 a magnet coil 87 for operating a carburetor choke to assist in starting the engine.

In operation, with the power plant at rest, the automatic starting of the unit is accomplished by the closing of any load circuit on the mains. This causes the winding 68 of the control switch 18 to become energized, as above pointed out, to close said control switch, thereby removing the ground from the engine magneto 48 so that it may be operative and closing contacts 74 to establish the circuit through the winding 69 of the cranking switch 20. This causes the cranking switch to close and thereby close the cranking circuit from the battery through the generator, which operates as a motor to start the engine. When the generator functions it energizes the voltage coil 76 of the generator relay 19 and closes the generator relay switch, which first opens the circuit through the cranking switch magnet 69 by disconnecting contacts 72, if that circuit has not been opened by the governor switch 91, and then connects the generator with the line by closing contacts 59. This operation also establishes the battery-recharging circuit by connecting contacts 59 with contact 79. The generator now supplies the line and, though the cranking switch 20 is open, the generator relay switch 19 and the control switch 18 remain closed, being held so by the action of the series holding coils 58 and 61 in the generator lead. This condition continues as long as the load remains on the line but as soon as there is no load the current coil 61 releases the armature of the control switch 18, permitting it to close the magneto grounding contacts 18 to stop the engine.

The purpose of the holding coils 58 and 61 in series with the load is to retain these two switches 19 and 18 closed even upon the occurrence of an overload or short circuit, thus preventing the re-establishment of the cranking circuit and maintaining the control mechanism in the running condition long enough for the fuses 17 to blow to stop the operation of the power plant.

The circuits as thus described are those relied on for the control of a generating unit of smaller capacity (such as 1½ K. W.) and, though they may be designed to control larger units, it is found desirable from a manufacturing standpoint and economical to standardize by the use of the same switching mechanism for larger generating units (such as 3 or 10 K. W. or larger) by providing an auxiliary relay to protect these series holding coils from the destructive action of current flow greater than that for which they are designed. This is accomplished by providing the auxiliary relay 90 having a series coil 92 in the main line lead 62 so as to carry the full load current and of such size wire as to be capable of carrying the full current strength of the generating unit. One of the pair of contacts 93 closed by the operation of the auxiliary relay 90 is connected by a wire 94 with the wire 62 at a point between coils 92 and 61, while the other is connected by a wire 95 with wire 57 so that the wires 94 and 95 with the closed contacts 93 form a shunt circuit for that portion of the line circuit including series holding coils 58 and 61 to relieve them of the burden of carrying all of the line current when the demand on the mains is for more current than said holding coils are designed to carry. The series coil 92 of the auxiliary relay is designed to become effective for closing the auxiliary relay when the current demand on the mains approaches the maximum for which the holding coils 58 and 61 are designed and the resistance of this shunt-protecting circuit is preferably made variable so that the portion of the line current diverted by it from the series holding coils will be greater as the demand increases. This may be accomplished by making one or both of the contacts 93 thereof in the form of a compressible carbon pile resistance unit 96 varying the resistance with the varying pull on the armature produced by the series coil 92.

By means of this auxiliary relay the series holding coils of the control switch and the generator relay relied on to maintain the switching mechanism in the running condition of the plant will operate in the same manner as with the lower capacity unit until the current demand on the mains reaches the predetermined value at which the auxiliary relay becomes effective and thereupon such holding coils will have a sufficient share of the line current passing through them to maintain them in their operative condition, but will be protected from excessive current flow by the operation of the auxiliary relay in diverting a portion of the line current from them through the variable resistance shunt circuit. As the current demand on the mains increases the strength of the series coil 92 increase and correspondingly the pressure on the compressible carbon pile resistance increases to reduce the resistance of the shunt circuit and thereby divert more of the current from the holding coils and keep the current flow through them within the limits for which they are designed.

As stated, the mere addition of the auxiliary relay adapts the switching mechanism of the lower capacity generating units for service with higher capacity generating units without injury thereto and with a much greater saving in cost of manufacture than if the controlling mechanism were wound for the higher capacity generating unit. In addition there is the advantage from the manufacturer's standpoint that the controlling units for plants of different capacities are uniform and replacement parts are the same for units of different capacities.

In the modification shown in Fig. 2, a different means is shown for varying the resistance of the protecting shunt circuit consisting in providing for steps of resistance 97 being cut out of the shunt circuit as the strength of the series coil 92 increases. Two of such steps are shown but obviously they may be of any number. While in practice the stationary contacts are yielding and are in such spaced relation with the armature that one after another is engaged, each new contact serving to short circuit a step of the resistance in the shunt circuit, for convenience in the diagram a yielding spring 98 is shown on the armature for first establishing the shunt circuit with all of the resistance included and then, on further movement of the armature, effecting engagement with a contact 93' connected with a tap on the resistance to short circuit a step of the resistance.

Also in this modification it is shown that the back contacts 72 of the generator relay may be shifted to the auxiliary relay, where they become back contacts 99, thus dispensing with the necessity for the holding coil 58 for the generator relay.

Otherwise the diagram of Fig. 2 is the same as that of Fig. 1 and the principles of operation remain the same, except that governor switch 91 alone is relied on for the normal opening of the cranking control circuit and the contacts 99 are only relied on to prevent the closing of the starting circuit upon the occurrence of an overload or short circuit.

What I claim as new and desire to secure by Letters Patent is:

1. In combination with the mains and the automatic control switching mechanism of gas-engine-operated generating units of the demand starter type having a relay provided with a holding coil in series with the mains, an auxiliary relay having a coil in series with the mains, a circuit in shunt with said holding coil controlled by said auxiliary relay for diverting a portion of the current in said mains from said holding coil, and means in said circuit for varying the resistance thereof depending on the strength of current flow through the mains.

2. In combination with the mains and the automatic control switching mechanism of gas-engine-operated generating units of the demand starter type having a relay provided with a holding coil in series with the mains, an auxiliary relay having a coil in series with the mains, a circuit in shunt with said holding coil controlled by said auxiliary relay for diverting a portion of the current in said mains from said holding coil, and means operated by the auxiliary relay for varying the resistance of the shunt circuit depending on the strength of current flow through the mains.

3. In combination with the mains and the automatic control switching mechanism of gas-engine-operated generating units of the demand starter type having a relay provided with a holding coil in series with the mains, an auxiliary relay having a coil in series with the mains, a circuit in shunt with said holding coil controlled by said auxiliary relay for diverting a portion of the current in said mains from said holding coil, and contacts engaged successively by the operation of the auxiliary relay, there being resistance in the shunt circuit controlled thereby.

4. In combination with the mains and the automatic control switching mechanism of gas-engine-operated generating units of the demand starter type having a relay provided with a holding coil in series with the mains, an auxiliary relay having a coil in series with the mains, a circuit in shunt with said holding coil controlled by said auxiliary relay for diverting a portion of the current in said mains from said holding coil, said automatic control switching mechanism also including a cranking control circuit, and contacts in said cranking control circuit controlled by the auxiliary relay.

In testimony whereof, I affix my signature.

EARL R. WITZEL.